United States Patent Office 3,556,912
Patented Jan. 19, 1971

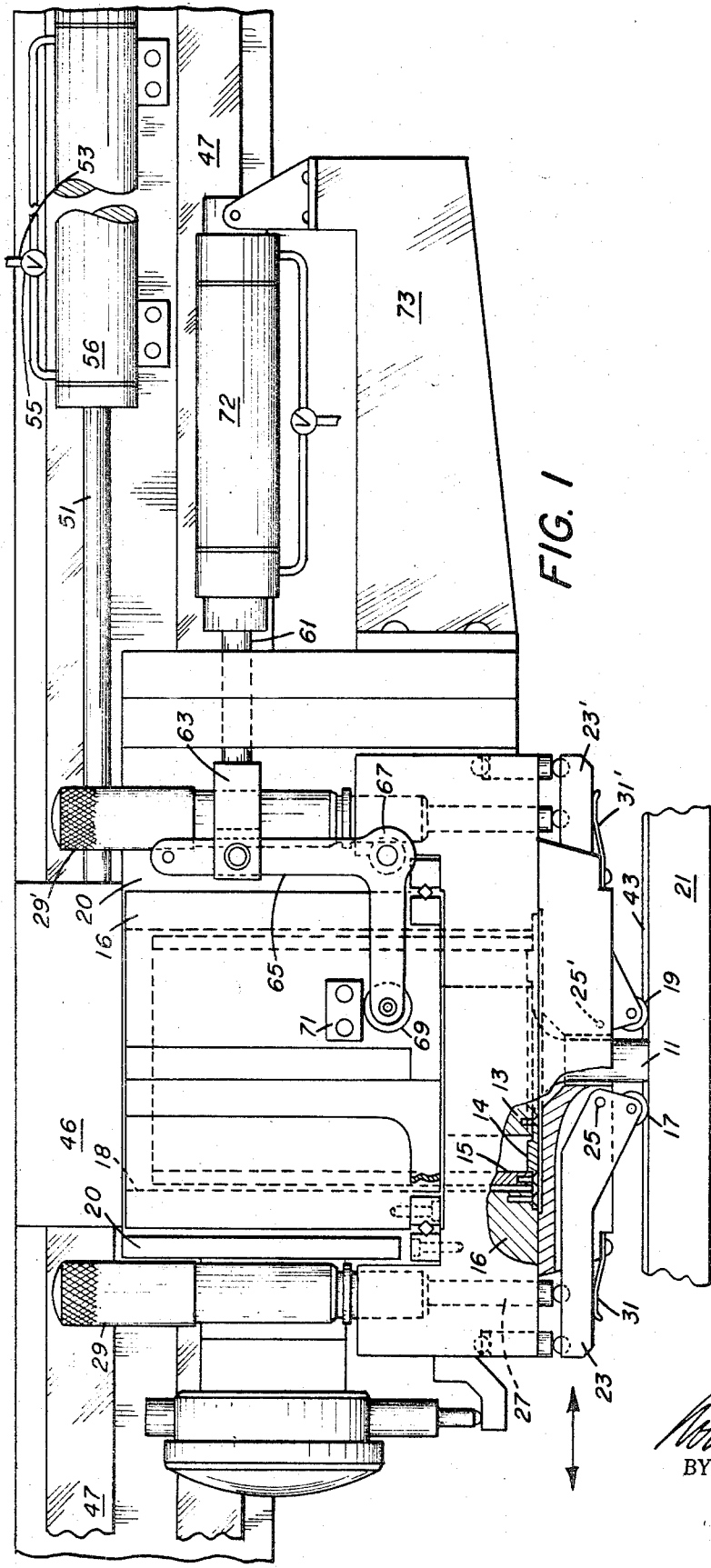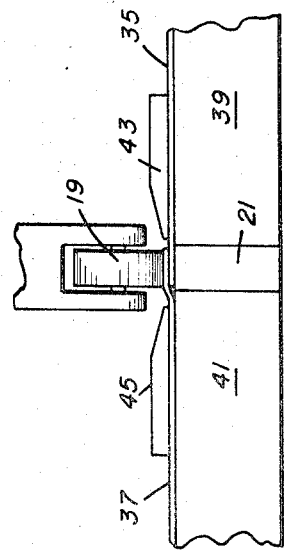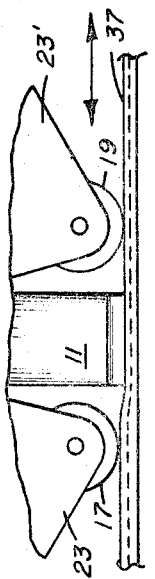
PAUL A. BURGO
CHARLES W. PIERSON
INVENTORS
ATTORNEYS

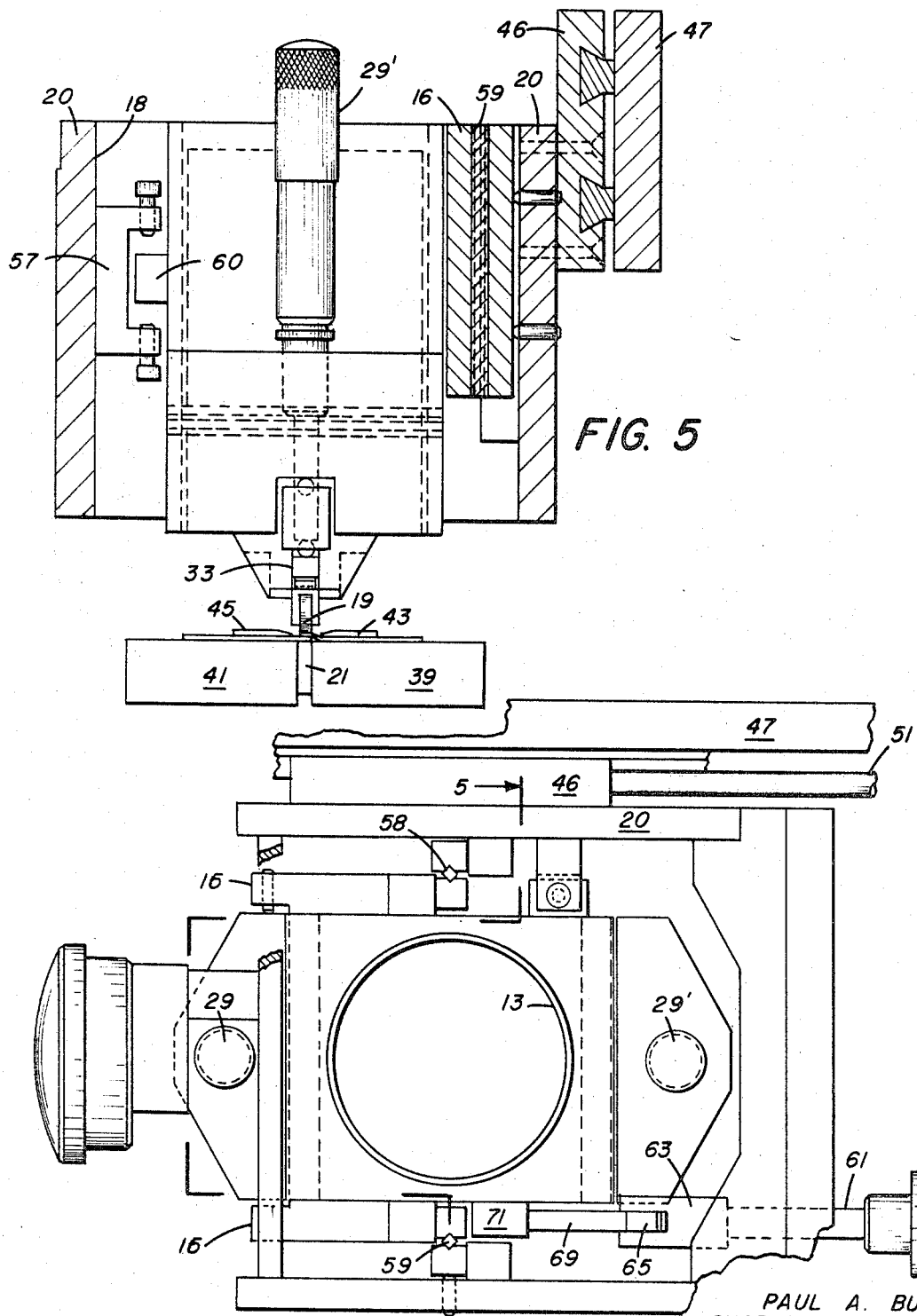

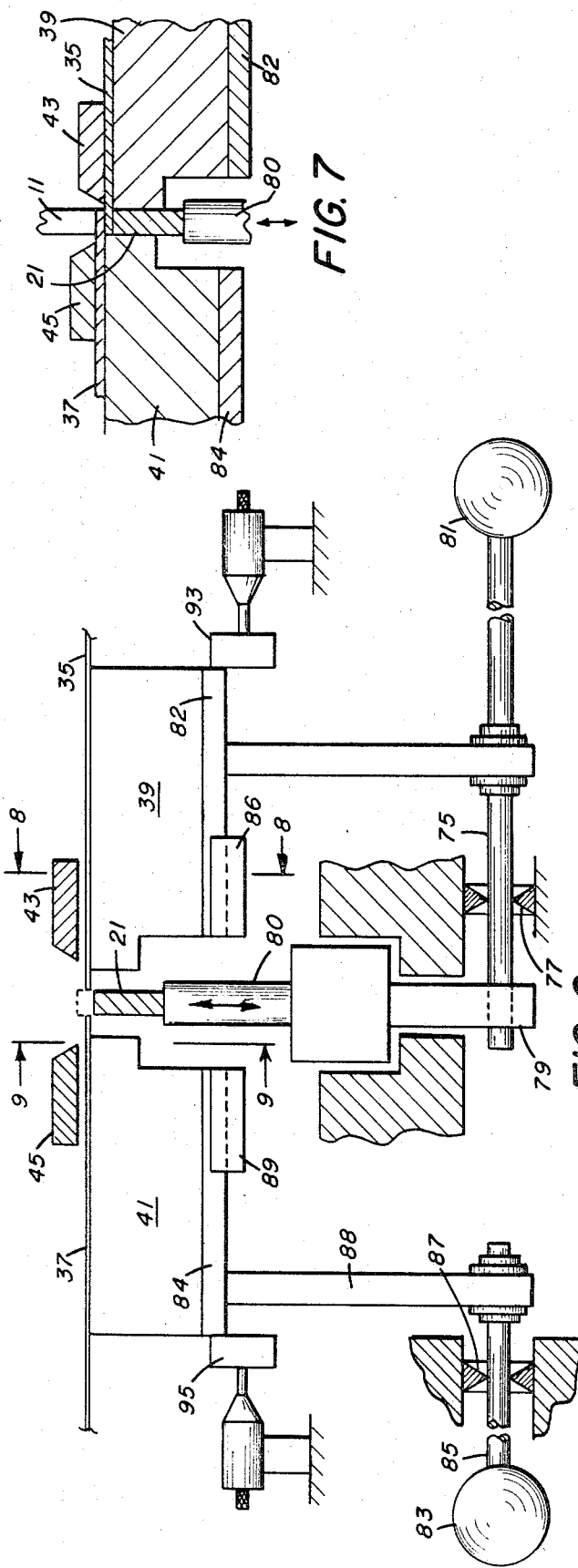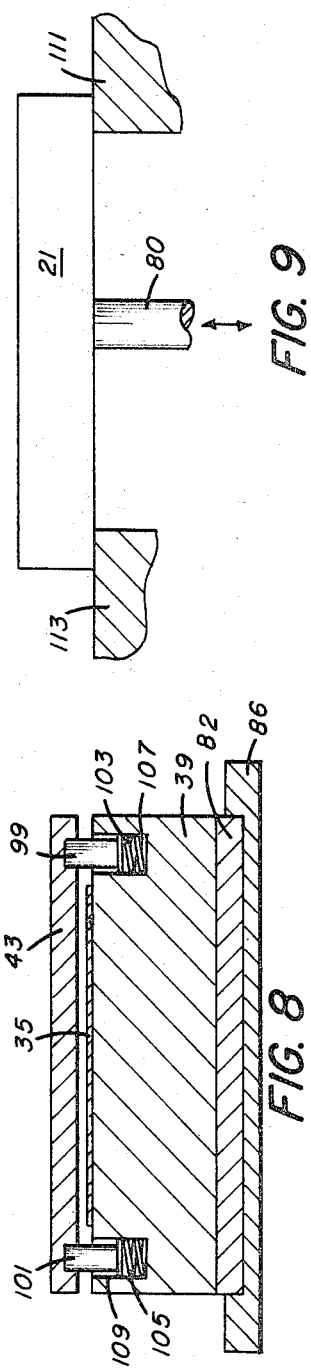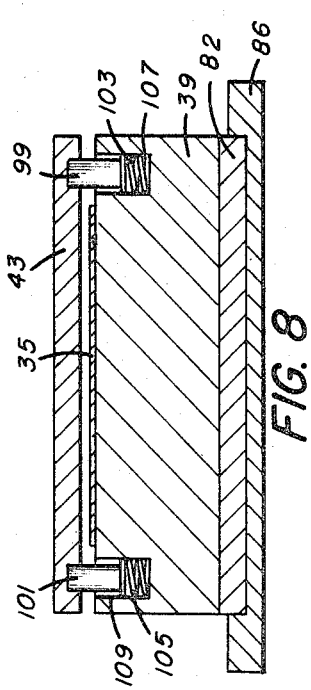

3,556,912
ULTRASONIC FILM SPLICING APPARATUS
Paul A. Burgo and Charles W. Pierson, Rochester, N.Y., assignors to Eastman Kodak Company, Rochester N.Y., a corporation of New Jersey
Filed Sept. 16, 1968, Ser. No. 762,207
Int. Cl. B23k 1/06; B29c 27/08
U.S. Cl. 156—580
18 Claims

ABSTRACT OF THE DISCLOSURE

An ultrasonic film splicing apparatus having independently adjustable spacing wheels preceding and following the ultrasonic horn. The horn and wheels are supported on a carriage which is moved horizontally along a track by a fluid actuated piston. The apparatus also comprises an anvil below the horn, and two tables on opposite sides of the anvil for supporting the films to be spliced. The anvil and tables are movable into and out of operative position so as to bring the two films into overlapping relation.

BACKGROUND OF THE INVENTION

Field of the invention

The present invention relates to novel apparatus for rapidly and effectively splicing together the ends of two sections or rolls of thermoplastic film, such as cellulose acetate or polyethylene terephthalate photographic film. This apparatus is especially adapted for the rapid splicing of films which may be only 0.004 inch thick, or even thinner, and which may range in width from a few inches up to as much as 76 inches.

The prior art

The splicing of photographic film has been accomplished in several ways in the past, as by adhesively joining the ends together or by applying adhesive tape to the ends. Ultrasonic sealing has been used for splicing together the overlapping edges of extremely thin films of thermoplastic packaging material, but it has been found that with the apparatus of the prior art it has been difficult, if not impossible, to successfully splice photographic film with the desired rapidity, accuracy, and effectiveness of the joint. For example, it has been difficult to overlap the ends of wide film precisely enough to provide a splice of small area and of a thickness which is almost identical to that of the film itself. Moreover, when splicing the ends of film together by traversing an ultrasonic horn across the film, it has been found that poor sealing is obtained at the edges where the horn comes up onto the overlapped films, or drops down from the overlapped films at the end of the splicing operation. Additionally, it has been difficult to space the horn precisely and to preserve such an exact spacing over a wide splice up to as much as 76 inches in width. Variations are encountered in the spacing because of the natural slight variations in the thickness of the film, as well as the impossibility of securing a precisely level long anvil to place under the films to be spliced, and under the ultrasonic horn.

SUMMARY OF THE INVENTION

In accordance with the present invention, there has been provided a novel apparatus for ultrasonically splicing together the ends of photographic film which overcomes the difficulties discussed above. The novel apparatus comprises an elongated anvil located under the splice, an ultrasonic horn which is much shorter than the anvil and is positioned adjacent the anvil and above the splice, means for moving the horn lengthwise of the anvil to splice the film together, and two spacers on opposite sides of the horn adapted to contact the film to be spliced and in position to precede and to follow the horn as it travels along the anvil. The spacers are independently adjustable up and down relatively to the horn for securing the correct spacing of the horn from the anvil. Normally, as the ultrasonic horn traverses the joint, the thickness of the two overlapped sections of film is reduced when they are united. It is for this reason that the spacers are independently adjustable, so that the spacer which precedes the horn will be somewhat higher than the spacer which follows the horn and which must roll on the united films.

Additionally, the novel apparatus is constructed for the rapid positioning of two ends of film in overlapping position above the anvil, and for holding them firmly in position during the splicing operation. To accomplish these results, the apparatus comprises two horizontally movable tables on opposite sides of the anvil, and clamping jaws for holding the ends of the film down on the tables. The anvil is vertically movable upwardly for a short distance to provide a stop against which the two ends of the film abut as they are slid onto the tables. Then the anvil is withdrawn downwardly, the clamping jaws are applied to hold the films upon the tables, and the tables are moved toward the anvil a precisely controlled distance to bring the edges of the film into overlapping relationship over the anvil. Overlapping is additionally assisted by moving one of the tables upwardly a short distance so that as it moves toward the anvil it brings the film edge over the film edges of the other section to assure overlapping without collision of the two film edges with one another.

THE DRAWINGS

FIG. 1 is a side elevational view of ultrasonic splicing apparatus embodying the principles of the invention;

FIG. 2 is an enlarged side elevational view of a part of the apparatus of FIG. 1, showing the end of the ultrasonic horn, the two spacers, and the profile of the films being spliced;

FIG. 3 is an enlarged end elevational view of the apparatus as seen from the right in FIG. 2;

FIG. 4 is a plan view of the apparatus shown in FIG. 1;

FIG. 5 is a cross sectional view taken along the line 5—5 in FIG. 4;

FIG. 6 is a schematic side elevational view, parts being in section, showing that portion of the apparatus for accomplishing the proper positioning of the films to be joined, in preparation for the ultrasonic splicing operation;

FIG. 7 is an end elevational view, similar to FIG. 3, but showing one of the films raised slightly above the other to secure the overlapping of the edges;

FIG. 8 is a cross sectional view taken along the line 8—8 in FIG. 6; and

FIG. 9 is a view taken along line 9—9 in FIG. 6.

THE PREFERRED EMBODIMENT

Referring to FIGS. 1 to 5, there is shown an ultrasonic welding horn 11 protruding downwardly from a transducer body 13 which it connected to both a cylinder 15 and a support 16 by three series of circumferentially spaced screws passing through a support plate 14. Cylinder 15 is located within an aperture 18 in support 16, which in turn is mounted within a frame 20, so as to move up and down therein, as well as horizontally as a unit therewith.

Two spacer wheels 17 and 19 are positioned before and after the horn 11 longitudinally of an anvil 21. Wheel 17 is rotatably mounted in a lever arm 23 which is pivotally mounted at 25 to the lower end of support 16 adjacent to, but spaced from, the horn 11. Lever arm 23 extends essentially horizontally away from the pivot 25, and near the far end thereof is in contact with a micrometer adjusting shaft 27 which is movable upwardly and downwardly by a micrometer 29 which is mounted on support frame 20, so as to vary the vertical position of wheel 17 with respect to horn 11. A leaf spring 31 under lever 23 is carried by support 20 and presses the lever upwardly to maintain the adjusted position of wheel 17. An identical micrometer adjusting mechanism 29' is associated with wheel 19 through lever 23', pivot 25', and spring 31', so that the two wheels are independently adjustable up and down with respect to horn 11.

With the described construction the wheel 17, which precedes the ultrasonic horn, normally is adjusted to a slightly higher level than the wheel 19 which trails the horn across the splice. Thus, as the apparatus is moved to commence the splice, it first approaches the edge of the overlapped films with the wheel 17 at the proper height to climb up onto the work and roll along the surface, thus assuring that the end of the horn does not strike the edges and dislocate them or damage them. Additionally, the wheel 17 rides along at the proper height for conducting the splicing operation as the horn is vibrated up and down with the extremely small amplitude and rapidity of motion customary with ultrasonic horns.

As the horn advances across the surface, it beats the surface of the overlapped films down slightly to effect the welding operation, and produces a splice which is about the same, or little more than, the thickness of a single film. To accommodate this situation the trailing wheel 19 is adjusted to a slightly lower position than wheel 17 so as to roll on the surface of reduced thickness. When the far edge of the splice is reached and wheel 17 has left the film, damage to the edge would occur if the horn were not supported as it moves off the edge. Preservation of the edge is assured by the wheel 19 running in the reduced thickness area trailing the horn.

As shown in FIG. 3, the two films 35 and 37 to be joined are laid out upon two horizontal tables 39 and 41 which are juxtaposed against the anvil 21, and are provided with a pair of vertically movable clamping jaws 43 and 45 to hold the films firmly in position during the splicing operation. Advantageously, the jaws 43 and 45 are held down by a magnetic chuck asssociated with the apparatus.

Now returning to FIG. 1, FIG. 4 and FIG. 5, support 16 is mounted within frame 20 which includes a carriage 46 movable along a horizontal track 47 extending transversely across the splice. Carriage 46 is coupled to a horizontally movable piston 51 actuated in opposite directions by means of pressure fluid introduced through a line 53 and a three-way valve 55 connected to the opposite ends of a cylinder 56 which is secured to the track 47 near the end thereof. Support 16 is movable up and down within the frame 20 in vertical slide bearings 58 and 59 to assure the proper horn spacing even though there might be some slight irregular up and down movement of the frame 20. A bracket 57 has upper and lower adjustable stop bolts to abut against a tongue 60 and thus limit the movement of support 16.

After a splice has been completed, the horn 11 and wheels 17 and 19 are raised above the surface and the apparatus is quickly returned to its starting position by turning valve 55. The horn is lifted by actuating a piston 61 connected to the frame 20 by a clevis 63 pivoted to one arm 65 of a bell crank which is pivoted between its ends on the frame at 67. The other end of the bell crank is provided with a cam wheel 69 positioned under and in contact with a cam plate 71 on the side of support 16. Thus, as the piston 61 moves from left to right in FIG. 1, the support 16 is lifted up during retraction. Piston 61 is actuated by pressure fluid introduced into a cylinder 72 carried on a bracket 73 projecting from the end of frame 20.

Now referring to FIG. 6, there will be described the construction of the film supporting tables and the anvil, together with their operating mechanism, which were described in a general way hereinabove. In order to avoid undue complications in the drawings, the apparatus has been shown in schematic skeleton form without including the precise supporting framework which would be readily apparent to the person having ordinary skill in this art.

The respective tables 39 and 41 are shown in slightly retracted position from the anvil 21 by a distance sufficient to bring the respective films into overlapping engagement over the anvil when the tables have been moved against the anvil. In the operation of the apparatus, a shaft 75 is positioned on a fulcrum 77 between its ends, so that the shaft can be pivoted up and down. The end of shaft 75 projects through a loosely fitting aperture 79 in the bottom of an anvil supporting column 80 so that pressure on the opposite end 81 of the shaft 75 raises the anvil into the position shown in dash line a short distance above the levels of the tables 39 and 41, for example ⅛ inch.

The two films 35 and 37 are placed on the table with their edges abutting against opposite sides of anvil 21. Then shaft 75 is actuated to lower anvil 21 to the level of the tables, and clamping jaws 43 and 45 are brought down against the tops of the film by actuating magnetic chucks 82 and 84 comprising part of the tables 39 and 41. Then table 41 is raised slightly by downward pressure on the outer end 83 of a lever 85 acting on a fulcrum 87 to raise shaft 88, thus bringing the level of film 37 slightly above that of film 35, as shown more clearly in FIG. 7.

Shafts 75 and 85 are then pushed horizontally toward one another to move the tables 39 and 41 in slide bearings 86 and 89 until they abut against the sides of anvil 21 with the film 37 slightly above the edge of film 35. Table 41 is then restored to a position level with table 39 by moving shaft 85 upwardly. Splicing is then accomplished in the manner described hereinabove. Upon completion of the splicing operation, the magnetic chucks are deactivated so that clamps 43 and 45 release the spliced film which can be removed, or pulled through until the next splice is required.

Shafts 75 and 85 are pulled apart to restore the tables 39 and 41 to their original position. Horizontally movable stops 93 and 95 having micrometer adjustments are provided for stopping the motion of the two tables at precisely the points to provide the proper spacing from anvil 21 to give the desired amount of overlap of the films 35 and 37 when the tables are later abutted against anvil 21.

FIG. 8 shows how the magnetic clamping jaws are mounted on tables 39 and 41. A pair of studs 99 and 101 project downwardly from bores in the jaw 43 near the sides thereof and spaced outwardly from the film 35, into corresponding bores in the table 39. A pair of coil springs 103 and 105 are located wtihin bores 107 and 109 in table 39 below the studs and pressing upwardly thereagainst to keep jaw 43 normally in raised position for insertion of a film. When the magnetic chuck within table 39 is energized, clamping jaw 43 is pulled downwardly and compresses the springs, thus holding the film tightly against the top surface of the table. Upon subsequently deenergizing the magnetic chuck, the clamping jaw 43 again moves upwardly under the influence of the springs to release the spliced film. The film can then be either pulled through the apparatus while being rolled up until the next free end is reached, or the clamping jaws 43 and 45 can be lifted off so that the film can be moved laterally out of the apparatus.

FIG. 9 shows anvil 21 resting adjacent its ends on a pair of supporting shoulders 111 and 113 for rigidity. When shaft 80 is raised, as described previously, slight skewing of the anvil is not harmful, but rigidity is essential for the splicing operation.

From the foregoing description it is evident that there has been provided a novel apparatus for splicing together the ends of film rapidly and effectively with a precise control of dimension, and without damage occuring to the edges of the film where the horn enters or leaves the splicing area. Moreover, this novel apparatus makes it possible to splice films of great width together even though there might be slight variations in film thickness and in anvil profile from one end to the other.

The invention has been described in detail with particular reference to preferred embodiments thereof, but it will be understood that variations and modifications can be effected within the spirit and scope of the invention as described hereinabove and as defined in the appended claims.

We claim:

1. Apparatus for ultrasonically splicing together two sections of thin plastic film comprising, in combination:
    an elongated anvil;
    an ultrasonic horn positioned adjacent said anvil, said horn being much shorter than said anvil;
    a support for said horn;
    means for moving said support lengthwise of said anvil to splice such films;
    two spacers on opposite sides of said horn in position to precede and follow said horn as it travels along said anvil, said spacers being carried by said support; and
    adjusting means for adjusting said spacers up and down relative to said horn.

2. Apparatus in accordance with claim 1 wherein said spacers are wheels.

3. Apparatus in accordance with claim 1 wherein said adjusting means comprises independent adjustors adapted to adjust said spacers independently whereby one of said spacers can be adjusted to a higher or lower position than the other relative to said horn.

4. Apparatus in accordance with claim 1, also comprising a track parallel to said anvil;
    a carriage running on said track; and
    means mounting said support on said carriage for free movement up and down relative to said carriage.

5. Apparatus in accordance with claim 3, wherein each adjustor is a lever pivotally mounted on said support and carrying said spacer, and a micrometer mounted on said support and acting on said lever at a point spaced from the pivot thereof to raise or lower said spacer.

6. Apparatus in accordance with claim 4 wherein said means for moving said horn lengthwise of said anvil is a cylinder containing a fluid actuated piston acting on said support.

7. Apparatus in accordance with claim 6, also comprising a second cylinder carried by said carriage; said apparatus also comprising a bell crank pivotally mounted between the ends thereof on said carriage, one end of said bell crank engaging said support, the other end of said bell crank engaging said piston whereby actuation of said piston operates said bell crank to raise said support along with said horn and spacers.

8. Apparatus in accordance with claim 1, also comprising two tables for film on opposite sides of said anvil; and retaining means for holding each section of film on a table with the edge thereof adjacent said anvil.

9. Apparatus in accordance with claim 8, also comprising means for moving said tables toward and away from said anvil to carry said sections of film into overlapping position for splicing.

10. Apparatus in accordance with claim 9, wherein said last named means is adapted to move said tables independently.

11. Apparatus in accordance with claim 9, also comprising means for moving said anvil up and down, whereby upon upward movement the top of said anvil projects above said tables to act as a film stop, and upon subsequent downward movement the top thereof assumes splicing position.

12. Apparatus in accordance with claim 9, also comprising means for moving one of said tables up and down to move a first one of said films to a higher plane than the other whereby upon movement of said tables toward said anvil said first one of said films overaps the other above said anvil.

13. Apparatus in accordance with claim 8 wherein each of said tables comprises a magnetic chuck, and wherein said retaining means comprises a pair of ferromagnetic jaws extending lengthwise of said anvil on opposite sides thereof and normally spaced above said tables.

14. Apparatus in accordance with claim 9, also comprising: a pair of stops for engaging said tables upon movement away from said anvil, and micrometer adjusting means for said stops to adjust precisely the spacing of each table from said anvil and thus adjust the amount of film overlap.

15. In apparatus for ultrasonically splicing together two sections of thin plastic,
    an elongated anvil;
    two tables for film on opposite sides of said anvil;
    retaining means for holding each section of film on a table with the edge thereof adjacent said anvil;
    means for moving both of said tables and said retaining means therewith toward and away from said anvil to carry said sections of film into overlapping position for splicing; and
    means for moving said anvil up and down, whereby upon upward movement said anvil projects above said tables to act as a film stop, and upon subsequent downward movement the top thereof assumes welding position.

16. In apparatus in accordance with claim 15, means for moving one of said tables up and down to move a first one of said films to a higher plane than the other whereby upon movement of said tables toward said anvil said first one of said films overlaps the other above said anvil.

17. In apparatus in accordance with claim 15, a pair of stops for engaging said tables upon movement away from said anvil, and micrometer adjusting means for said stops to adjust precisely the spacing of each table from said anvil and thus adjust the amount of film overlap.

18. In apparatus in accordance with claim 15, each of said tables comprising a magnetic chuck, and said clamping means comprising a pair of ferromagnetic jaws extending lengthwise of said anvil on opposite sides thereof and normally spaced above said tables.

References Cited

UNITED STATES PATENTS

| 2,460,619 | 2/1949 | Briskin | 156—507 |
| 3,257,257 | 6/1966 | Karsten et al. | 156—583X |
| 3,418,185 | 12/1968 | Balamuth et al. | 228—1X |

FOREIGN PATENTS

| 720,919 | 4/1942 | Germany | 156—507 |

BENJAMIN A. BORCHELT, Primary Examiner

J. J. DEVITT, Assistant Examiner

U.S. Cl. X.R.

156—73, 507; 228—1